United States Patent [19]

Seki et al.

[11] Patent Number: 5,732,295
[45] Date of Patent: Mar. 24, 1998

[54] CAMERA WITH BATTERY CHECKUP FUNCTION

[75] Inventors: Yoichi Seki; Hiroyuki Saito; Teruyo Miyata; Tetsumi Kaneoka, all of Yotsukaido, Japan

[73] Assignee: Seiko Precision Inc., Japan

[21] Appl. No.: 639,377

[22] Filed: Apr. 26, 1996

[30] Foreign Application Priority Data

Apr. 27, 1995 [JP] Japan ................... 7-103964

[51] Int. Cl.$^6$ .............. G03B 7/26; G01N 27/42
[52] U.S. Cl. ............. 396/279; 346/272; 324/429; 324/433
[58] Field of Search .................. 354/468, 484; 396/277, 279; 348/372; 324/426, 429, 433

[56] References Cited

U.S. PATENT DOCUMENTS

| | | | |
|---|---|---|---|
| 4,716,433 | 12/1987 | Alyfuku ................. | 396/279 |
| 4,821,338 | 4/1989 | Naruse et al. ........... | 324/429 |
| 4,866,471 | 9/1989 | Ikuta ................... | 396/279 |
| 5,070,357 | 12/1991 | Kazami et al. .......... | 396/279 |
| 5,164,761 | 11/1992 | Isono et al. ........... | 396/277 |
| 5,424,800 | 6/1995 | Suzuki ................. | 396/279 |
| 5,473,262 | 12/1995 | Yoshimatsu ............. | 324/429 |
| 5,528,335 | 6/1996 | Terunuma ............... | 396/279 |

Primary Examiner—Safet Metjahic
Assistant Examiner—Michael Dalakis
Attorney, Agent, or Firm—Adams & Wilks

[57] ABSTRACT

A camera with a battery checking function is provided with a timer for generating an output signal at predetermined time intervals, a memory for storing a calculated time value, an external switch for generating an activating signal for activating the camera, and a microcomputer for activating the camera in response to the activating signal generated by the external switch, for updating the content of the memory in accordance with the output of the timer at first time intervals when the camera is activated, for placing the camera in a standby mode when the activating signal has not been detected for a predetermined period of time, and for updating the content of the memory in accordance with the output of the timer means at second time intervals, longer than the first time intervals, when the camera is in a standby mode. A voltage detector detects the voltage of a battery at third time intervals when the camera is activated and detects the voltage of the battery at fourth time intervals when the camera is in the standby mode. A display indicates the charge level of the battery.

22 Claims, 3 Drawing Sheets

| battery voltage | display | |
|---|---|---|
| higher than V2 | (a) |  |
| higher than V1 lower than V2 | (b) |  |
| lower than V1 | (c) |  | ing data onto the film...

CAMERA WITH BATTERY CHECKUP FUNCTION

BACKGROUND OF THE INVENTION

1. Field of the Invention

The present invention relates to a camera having a battery checkup function.

2. Related Art

In known cameras capable of photographing data onto the film, there is one type that is provided with a timer circuit including an oscillation circuit, a frequency and, date calculating means and in addition to a control circuit for controlling the photographing operation of the camera. For this type of camera, it is necessary to incorporate two, one microcomputers of which constitutes the control circuit and the other constitutes the timer circuit so that not only is the structure of the camera, complicated but the price of the camera becomes high.

In order to eliminate the above disadvantages, there has been proposed a camera as disclosed in Japanese Laid-open Patent Publication No. H3-140931. This camera is provided with a control circuit including an oscillation circuit and a frequency divider circuit and incorporates therein a starting signal outputting means for generating a starting signal at predetermined intervals so that a central processing unit (hereinafter referred to as the "CPU") is activated every predetermined interval in response to the starting signal to update the time data. Further, the time interval for starting the CPU is altered depending on the data entry modes thereby saving the consumption of electric current. In a such camera, however, since the degree of consumption of the charge of the battery can not be confirmed before starting the camera, the battery voltage is first detected by a voltage detector upon start-up and only when the voltage is found to be in a level sufficiently high for photographing, can the next operation be executed.

Further, where the camera has not been used for a long time, even with the provision of the above-described means for controlling the consumption of electric current, since the power of the battery is slowly consumed over in a prolonged period of time, the level of the battery voltage becomes insufficient for photographing so that when the camera is started for a photographing operation, there is the possibility of the CPU malfunctioning.

Moreover, providing a voltage detector connected to the reset terminals of the control circuit for the purpose of preventing the erroneous operation of CPU is disadvantageous in a compact camera based on the desire miniaturization reduction of as well as the manufacturing cost of the camera.

Thus, in order to solve the above-described problems, the present invention provides a camera with a battery checkup function comprising timer means for generating a first output every predetermined period of time, counter means for counting the output of the timer means and for generating a second output when a count value reaches a predetermined value, storage means for storing a result of counting by the counter means at when the output of the timer means is generated, means including an analog/digital converter for detecting the voltage of a battery in response to the output of the counter means, comparison means for comparing the output of the analog/digital converter with a predetermined value and for generating a result of the comparison and warning means for generating a warning in response to the output of the comparison means.

According to the present invention, the battery voltage is detected at predetermined intervals which are comparatively long, such as one day, one week, and the like, and operation of the camera is prohibited when the battery voltage is below a predetermined level and a warning indication or display is effected.

PREFERRED EMBODIMENT OF THE INVENTION

Figure 1:
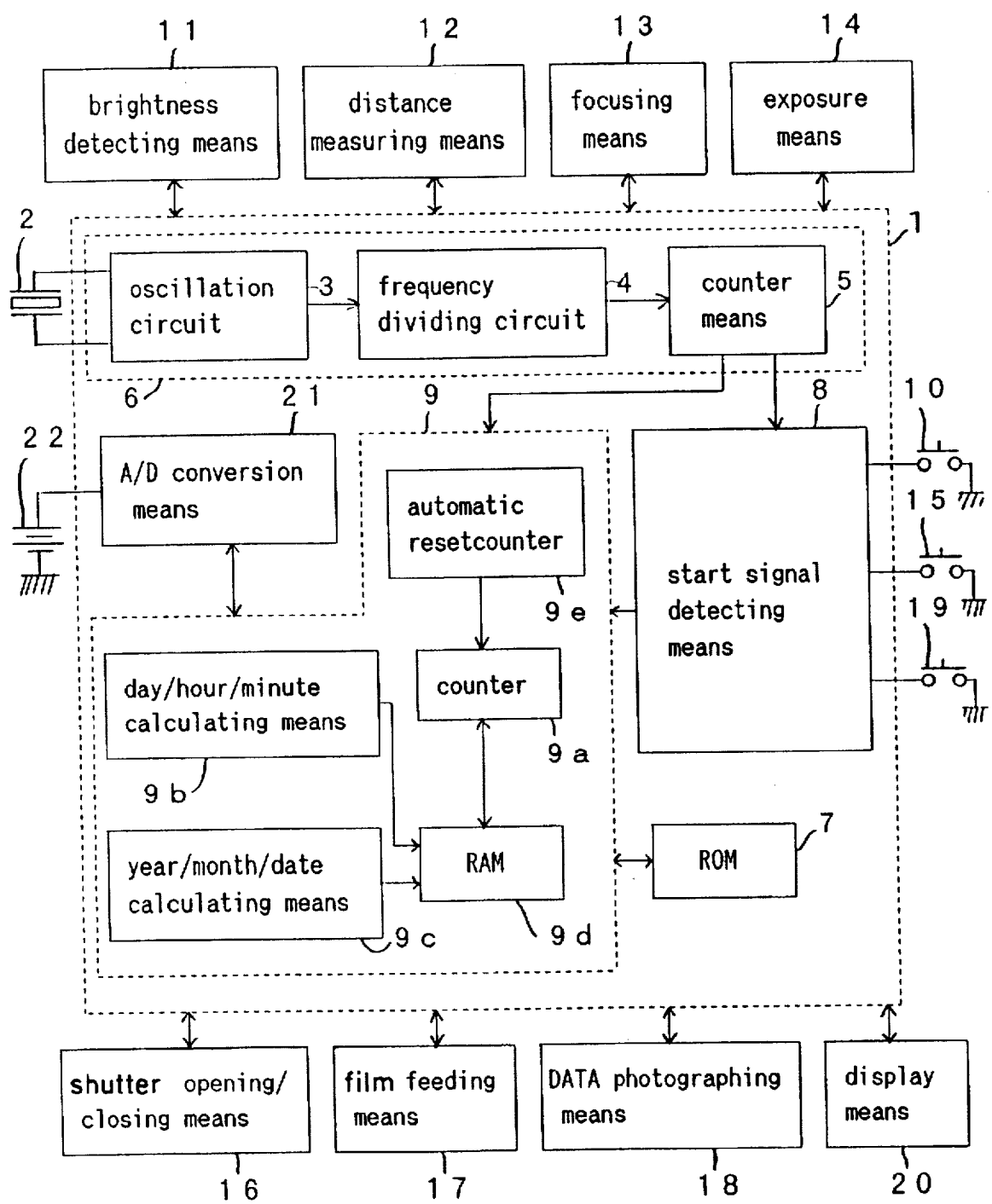
FIG. 1 is a block diagram of a camera with a battery checkup function according to one embodiment of the present invention.

FIG. 1 is a block diagram of a camera provided with a battery checkup function according to one embodiment of the present invention. This camera has a photographing control circuit 1 having a data photographing function for photographing timing data onto a film. Further, the photographing control circuit 1 which electrically controls all the operations of the camera comprises: start signal generating means 6 comprising an oscillation circuit 3 connected with a crystal oscillator 2, a frequency dividing circuit 4 for dividing the signal from the oscillation circuit 3, and counter means 5 for performing a time counting operation on the basis of a reference clock signal from the frequency dividing circuit 4; start signal detecting means 8 receives a start signal from the counter means 5; a CPU 9 which is activated by the start signal detecting means 8, a read only memory (hereinafter referred to as a "ROM") 7 connected to the CPU 9 and adapted to retain a program and data; and A/D converter means 21 for detecting the voltage of a power source battery and for converting it from an analog to a digital value.

The CPU 9 incorporates therein a counter 9a, day/hour/minute calculating means 9b, year/month/date calculating means 9c, a memory ("RAM") 9d for storing year through hour data and an automatic reset counter 9e. The counter 9a performs an adding operation in response to the start signal and counts on a minute unit. The added result is used for calculation by the day/hour/minute calculating means 9b to obtain the hour and minute values. Next, in the year/month/date calculating means 9c, the values obtained by the day/hour/minute calculating means 9b are compared with the calendar stored in advance therein and in consideration of the number of days of the related month and the leap year, the values of the year, month, date, are calculated. Thus, the year, month, date, hour and minute are obtained and stored in the memory 9d.

The above-described control circuit 1 is then connected with a release switch 10, brightness detecting means 11 for detecting brightness of a target object, distance measuring means 12 for measuring the distance to the target object, focusing means 13 for driving a photographic lens barrel, exposure means 14 for properly exposing the film surface to light, a camera main switch 15, shutter opening and closing means 16 and film feeding means 17 so as to control the photographing operation. Further, the control circuit 1 is also connected with data photographing means 18 for photographing data stored in the memory 9d onto the film, a changeover switch 19 for selecting the data to be photographed and display means 20 including a liquid crystal panel for displaying the data to be photographed.

Figure 2:
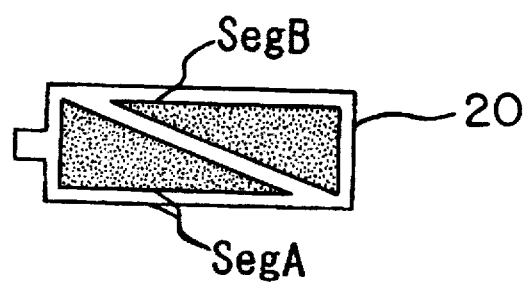
FIG. 2 is a diagram showing one of the possible display modes of a display means incorporated into the camera shown in FIG. 1.
Figure 3:
FIG. 3 is a diagram showing display modes of the display means corresponding in the voltage variation of the level of the battery inserted in the camera shown in FIG. 1.
Figure 3:
Figure 3:

Next, an operation of displaying data to be photographed onto the film in accordance with the result of the battery voltage check (hereinafter referred to as BC) will be described with reference to FIGS. 2 and 3. FIG. 2 shows the structure of the display means 20 which includes therein a battery charge residual amount display section. The residual amount of the battery charge is represented by two segments SegA and SegB, of which the segment SegA indicates one half of the entire residual amount of the battery charge and the segment SegB indicates the remaining half thereof. The outer profile of a battery is printed on the surface of the display means 20. As shown in FIG. 3, when both of the segments SegA and SegB light up, the battery voltage is V2 or more so that the residual amount of battery charge is adequate. Similarly, when only the SegA lights up, the battery voltage is in the range between V1 and V2 with only a small amount of residual electric charge. Further, when both of the segments SegA and SegB do not light up, the battery voltage is less than V1, and the operation of each part of the camera is prevented so that the battery must be replaced. The operation of the display means 20 in the above modes is carried out continually irrespective of whether the camera is in operation or on standby. Note that in the above-described display modes, the voltage V1 is at lowest voltage to guarantee operation of the camera and V2 is a voltage at which every operation of the camera can be performed without any trouble.

In the case of the above type of camera, when the shutter is closed or when a predetermined period of time lapses while the user does not operate the camera, the camera is placed in a standby mode by an instruction from the CPU 9. In such a standby mode, only the time data for use in the photographing of data is updated. As the photographing of data is not performed when the camera is not in a photographing mode, and it is therefore not necessary to update data minutely at one minute intervals so that the data is updated by starting the CPU 9 at, for example, 10 minute intervals to thereby save the consumption of electric current.

Further, with the year/month/date calculating means 9c, the passage of one period is detected. After a lapse of the period, the battery voltage is detected at the time of activating the CPU 9 for the updating of data and, the detected voltage is converted into a digital value by the A/D) converter means 21 and the resultant digital value is output to the CPU 9. Then, the CPU 9 compares the digital value with the voltage V1 which is stored in advance in the ROM 7 and when it is judged to be lower than the voltage V1 , the display means 20 displays the mode (c) as shown in FIG. 3 to thereafter cease the time-counting operation. On the other hand, when the outputted digital value is found to be higher than the voltage V1, it is compared with the voltage V2, and, after causing the display mode (a) or (b) in FIG. 3 to be displayed on the display means 20 depending on the result of the comparison, the camera is held in the standby mode again and continues the counting of time and updating of the data.

When the user turns on the main switch 15 to start a photographing operation, if the battery voltage is higher than the voltage V1 as a result of the above-mentioned battery voltage detection, there arises no problem with respect to the operation of the camera so that it is not necessary to repeat the battery voltage detection.

Further, although in preferred embodiment the time interval for updating the data is set to a period of 10 minutes, it does not matter if the interval is longer or shorter than that period. In addition, although the time interval for starting the A/D converter means 21 is set to a period of one day in this embodiment, it does not matter only if the time interval is longer than the starting time. The selection of such time intervals is a matter of design choice.

As described above, the present invention has various advantages, such that when a starting operation is repeated periodically while the camera is in its standby mode the battery voltage is checked at a predetermined time interval longer than the starting operation intervals, and when the battery voltage is found to be lower than a predetermined level, a warning or display is given so that even when the camera is not used for a prolonged period of time, it is possible to detect in advance a state in which the proper operation of the CPU can not be guaranteed due to a decrease in the capacity of the battery, thereby preventing the camera from being operated erroneously due to a runaway operation of the CPU. Further, since the detection of the battery voltage at the time of starting the camera, the additional voltage detector for the battery circuit can be dispensed with to thereby reduce the number of parts used.

What is claimed is:

1. A camera having battery checking means comprising: timer means for generating an output signal at predetermined time intervals; time storing means for storing a calculated time value; a switch for generating an activating signal for activating the camera; control means for activating the camera in response to the activating signal generated by the switch, for updating the content of the time storing means in accordance with the output of the timer means at first time intervals when the camera is activated, for placing the camera in a standby mode when the activating signal has not been detected for a predetermined period of time, and for updating the content of the time storing means in accordance with the output of the timer means at second time intervals, longer than the first time intervals, when the camera is in a standby mode; voltage detecting means for detecting the voltage of a battery at third time intervals when the camera is activated and for detecting the voltage of the battery at fourth time intervals when the camera is in the standby mode; and indicator means for indicating the charge level of the battery.

2. A camera having battery checking means according to claim 1; wherein the fourth time intervals are longer than the second time intervals.

3. A camera having battery checking means according to claim 1; wherein the control means comprises a microprocessor.

4. A camera having battery checking means according to claim 1; wherein the control means includes means for comparing the detected battery voltage with a predetermined voltage level and for prohibiting operation of the camera when the value of the detected voltage is lower than the predetermined level.

5. A camera having battery checking means according to claim 1; wherein the control means includes means for comparing the detected battery voltage with a plurality of predetermined voltage levels; and the indicator means includes a display having indicator elements corresponding to the plurality of predetermined voltage levels for indicating the relative voltage of the battery.

6. A camera having battery checking means according to claim 5; wherein the fourth time intervals are longer than the second time intervals.

7. A camera having battery checking means according to claim 1; wherein the indicator means comprises a display for indicating the charge level of the battery.

8. A camera having battery checking means according to claim 1; wherein the indicator means comprises a segmented display for indicating the relative charge level of the battery.

9. A camera having battery checking means according to claim 8; wherein the indicator means further comprises indicia resembling a battery.

10. A camera having battery checking means according to claim 1; further comprising brightness detecting means for detecting the brightness of a target object.

11. A camera having battery checking means according to claim 1; further comprising distance measuring means for measuring the distance of a target object.

12. A camera having battery checking means according to claim 11; further comprising a lens having a focusing barrel; and focusing means for driving the lens barrel in accordance with the measured distance of the target object.

13. An electronic device having battery checking means, comprising: timer means for generating a first output signal at predetermined time intervals; counter means for counting the first output signals and generating a second output signal when the count exceeds a predetermined value; a memory for storing a count value; a switch for generating an activating signal; control means responsive to the activating signal for activating the electronic device, for updating the count value stored in the memory in accordance with an output of the counter means at first intervals when the electronic device is activated, for placing the electronic device in a standby mode when the activating signal has not been detected for a predetermined period of time, and for updating the content of the memory in accordance with the output of the timer means at second time intervals, longer than the first time intervals, when the electronic device is in a standby mode; battery voltage detecting means for detecting the voltage of a battery at third time intervals when the electronic device is activated and for detecting the voltage of the battery at fourth time intervals when the electronic device is in the standby mode; and indicator means for indicating the charge level of the battery.

14. An electronic device having battery checking means according to claim 13; wherein the electronic device is a camera and the battery is used for driving the camera.

15. An electronic device having battery checking means according to claim 13; wherein the fourth time intervals are longer than the second time intervals.

16. An electronic device having battery checking means according to claim 13; wherein the control means comprises a microprocessor.

17. An electronic device having battery checking means according to claim 13; wherein the control means includes means for comparing the detected battery voltage with a predetermined voltage level and prohibiting operation of the electronic device when the value of the detected voltage is lower than the predetermined voltage level.

18. An electronic device having battery checking means according to claim 13; wherein the control means includes means for comparing the detected battery voltage with a plurality of predetermined voltage levels; and the indicator means includes a display having indicator elements corresponding to the plurality of predetermined voltage levels for indicating the relative voltage of the battery.

19. An electronic device having battery checking means according to claim 18; wherein the fourth time intervals are longer than the second time intervals.

20. An electronic device having battery checking means according to claim 13; wherein the indicator means comprises a display for indicating the charge level of the battery.

21. An electronic device having battery checking means according to claim 13; wherein the indicator means comprises a segmented display for indicating the relative charge level of the battery.

22. An electronic device having battery checking means according to claim 21; wherein the indicator means further comprises indicia resembling a battery.

* * * * *